United States Patent [19]
Lees et al.

[11] Patent Number: 5,662,358
[45] Date of Patent: Sep. 2, 1997

[54] BRANCH-OFF CONNECTION

[75] Inventors: George Albert Lees, Nottingham; Stuart Nigel Godfrey, Derbyshire, both of United Kingdom

[73] Assignee: Uponor Limited, Derbyshire, United Kingdom

[21] Appl. No.: 416,819

[22] PCT Filed: Oct. 14, 1993

[86] PCT No.: PCT/GB93/02121

§ 371 Date: Jun. 16, 1995

§ 102(e) Date: Jun. 16, 1995

[87] PCT Pub. No.: WO94/09305

PCT Pub. Date: Apr. 28, 1994

[30] Foreign Application Priority Data

Oct. 17, 1992 [GB] United Kingdom ............ 9221843
Jul. 7, 1993 [GB] United Kingdom ............ 9314003

[51] Int. Cl.⁶ .................................................. F16L 35/00
[52] U.S. Cl. ......................... 285/3; 285/23; 285/197
[58] Field of Search ................... 285/3, 4, 23, 197, 285/220

[56] References Cited

U.S. PATENT DOCUMENTS

| | | | |
|---|---|---|---|
| 3,285,627 | 11/1966 | Kozulla et al. | 285/3 |
| 3,598,428 | 8/1971 | Smith et al. | 285/3 X |
| 3,844,585 | 10/1974 | Sands et al. | 285/3 |
| 4,116,472 | 9/1978 | Schmitt | 285/4 |
| 4,140,337 | 2/1979 | Arcella et al. | 285/3 |

FOREIGN PATENT DOCUMENTS

| | | | |
|---|---|---|---|
| 982004 | 2/1965 | United Kingdom | 285/3 |
| 1363471 | 8/1974 | United Kingdom | F16L 41/04 |
| 2151737 | 7/1985 | United Kingdom | F16L 37/28 |
| WO83/02990 | 9/1983 | WIPO | F16L 41/06 |

*Primary Examiner*—Terry Lee Melius
*Assistant Examiner*—Heather Shackelford
*Attorney, Agent, or Firm*—Fish & Richardson, P.C.

[57] ABSTRACT

An adaptor (1) and method for fitting or replacing a branch-off connection in a fluid distribution main in which the adaptor (1) is inserted into a hole in the wall of the distribution main, the adaptor (1) comprising a rigid body (2) with an internal bore (3) therein, the internal bore (3) being closed with a displaceable blocking element (10), and a service pipe (16) is inserted into the internal bore (3) of the adaptor (1) so as to displace the blocking element (10) and open the internal bore (3) of the adaptor (1).

20 Claims, 2 Drawing Sheets

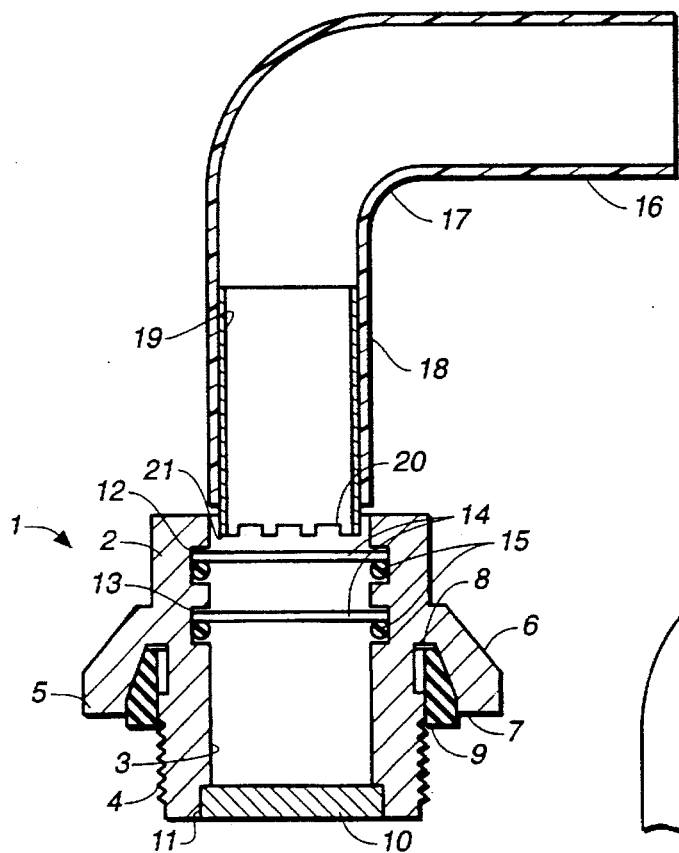
FIG._1
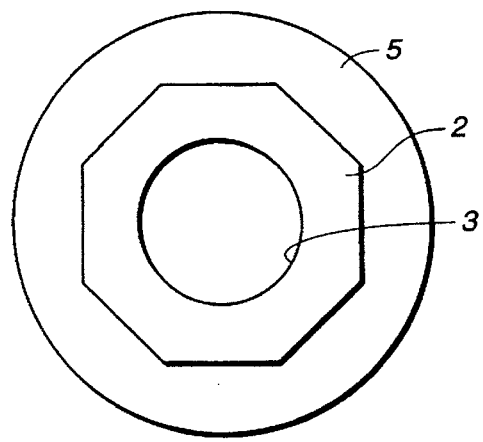
FIG._2
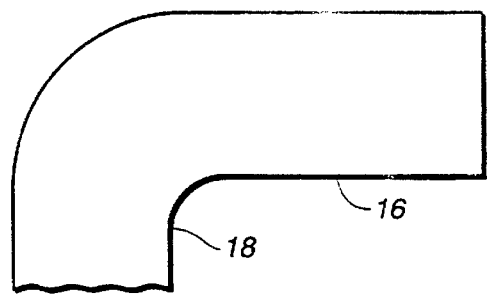
FIG._3A
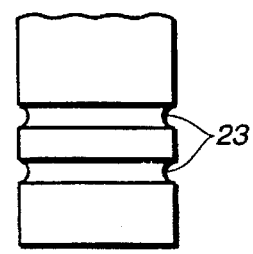
FIG._3B

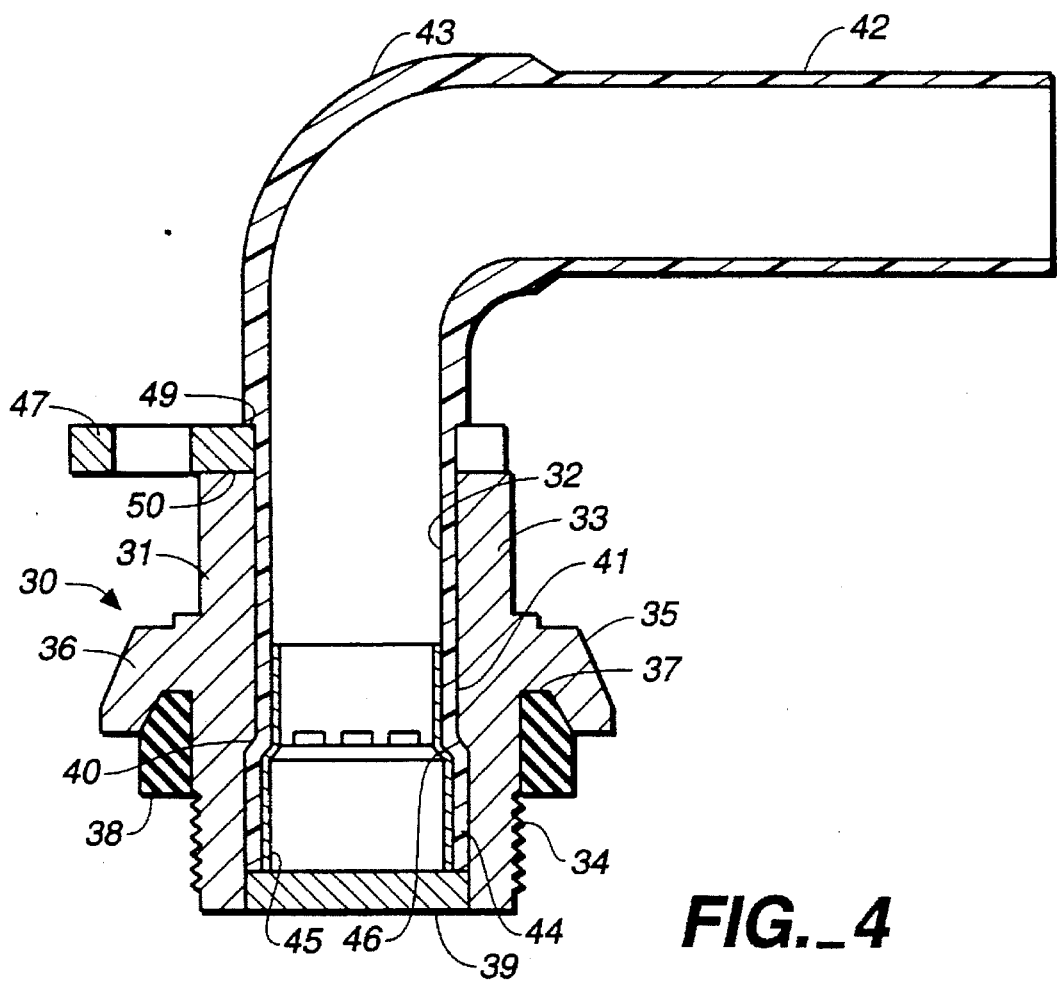
FIG._4
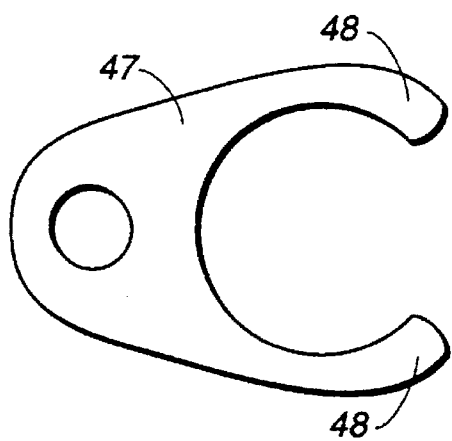
FIG._5

BRANCH-OFF CONNECTION

This invention relates to an adaptor and method for making a branch-off connection, and more part particularly to an adaptor and method for providing a branch-off connection to a fluid distribution main.

Gas distribution mains normally consist of a cast iron gas pipe which is laid in the ground. In order for a subscriber to be connected to the main by means of a service pipe, hitherto a tee connection has been made in which an externally threaded metal tee piece is inserted into a screw-threaded bore formed in the wall of the gas main. The tee piece has an annular screw-threaded bore which is provided with a top cap and a screw-threaded plug which can be accessed by removal of the cap. A side pipe for connection to the consumer service pipe is connected to the bore at a point intermediate its ends.

The replacement of a tee piece is a difficult and costly operation. First a hole must be dug in the ground and the tee piece and distribution main exposed. The cap of the tee piece is then removed and the plug wound down until it is below the level of the side pipe. The service pipe connection to the consumer is then sawn off. Next a bell having two compartments connected by a slide valve is placed over the tee piece and secured in a gas-tight fashion by chains passing around the distribution main. With the slide valve open the tee piece is unscrewed and lifted into the top chamber of the bell. The slide valve is then closed and the top chamber of the bell evacuated of gas so that the tee piece can be removed. A new tee piece that may be metal or plastic, but at least has the possibility of connection to a plastic subscriber service pipe is then inserted into the bell. The new tee piece has its plug wound down so that, when the slide valve is opened and the tee piece screwed into the distribution main, the plug effectively prevents any gas from escaping. Finally the subscriber service pipe is connected to the side pipe, the system pressure tested, and the plug wound up in order to allow gas to flow along the subscriber service pipe. The top cap is then replaced to ensure the gas-tightness of the tee piece.

It can be seen from the above that the replacement procedure is both difficult and time consuming. In addition, the injection moulded tee piece is an expensive item.

In GB2151737, there is described a connector for producing a joint between a compressed air main and a line to be joined thereto, which comprises a connection socket, made of elastic material, and fixed in a port in the wall of the main. The socket has elastic lips resting against each other to shut off the port, and, when a compressed air line is inserted into an opening in the socket the elastic lips are splayed outwards to allow air to pass into the line.

In GB1363471, there is described a ferrule and seal assembly for tapping into a fluid pipeline in which a hole is formed in the pipeline and the ferrule and seal pressed in the seal is cup-shaped and formed from a resiliently deformable material. Downward pressure by the ferrule on the bottom of the seal causes it to break and allow fluid to enter the ferrule body.

In WO83/02990 there is described a pipe tapping assembly comprising a mounting part having a raised outlet housing and a detachable connector assembly supported by the mounting part in sealed relationship with the pipe. Sealing is achieved by a sealing assembly which comprises a plurality of flexible sectoral leaves which in their closed position abutt tightly against one another to form a seal but which may be parted to enable a drill or like tool to pass therethrough for drilling an aperture in the pipe.

It is an object of the present invention to provide a novel adaptor and method for fitting or replacing a branch-off connection in a fluid distribution main which requires fewer, less expensive and more reliable components, and fewer method steps.

In a first aspect, the present invention provides an adaptor for fitting or replacing a branch of connection in a fluid distribution main and adapted to be received in a hole in a well of the fluid distribution main, which comprises:

a rigid body having an internal bore therein, the internal bore being adapted to receive a service pipe herein and having an internal annular seal adapted to form a gas-tight seal with the service pipe, and a blocking means positioned so as to close the internal bore, said blocking means being displaceable by the service pipe so as to open the internal bore, the rigid body having a threaded section and an external annular seal adapted to form a gas-tight seal with the wall of the fluid distribution main.

In another aspect the invention provides a method of fitting or replacing a branch-off connection in a fluid distribution main which comprises:

inserting an adaptor into a hole in a wall of the distribution main, the adaptor comprising a rigid body with an internal bore therein, the internal bore being provided with a displaceable blocking means, and inserting a service pipe into the internal bore of the adaptor so as to displace the blocking means and open the internal bore of the adaptor.

In order that the service pipe is connected to the distribution main in a gas-tight manner, there will usually be provided sealing means between the distribution main and the adaptor, and between the adaptor and the service pipe, such that on inserting the service pipe into the adaptor the service pipe is connected to the distribution main in a gas-tight manner.

The adaptor has a screw-threaded external section which cooperates with a screw-threaded hole in the gas distribution main. All external annular seal is also provided on the adaptor, which may, for example, comprise an O-ring seated in a recess in an annular flange.

The internal bore of the adaptor need not be threaded, thus saving on manufacturing costs, but is provided with an internal annular seal to seal the bore against the external wall of the service pipe. The internal annular seal may, for example, comprise annular gas seals an end-loading rings.

The displaceable blocking means will usually comprise a rigid wall or membrane which completely closes off the internal bore of the adaptor in such a fashion that gas or air cannot pass in either direction. The displaceable blocking means may, for example, comprise a rupturable or frangible wall or membrane, but is preferably a knock-out plug which may, for example, be positioned at the distribution main end of the internal bore of the adaptor and, for example, it may be seated in a recess at the end of the internal bore.

By a service pipe in this specification is meant a pipe leading from the distribution main to other premises, usually a subscriber or group of subscribers. The service pipe can, of course, be of any length, and may have branches and joins along its length. At its end adjacent to the adaptor the service pipe may be a straight pipe, but is preferably an elbow, and most preferably a 90° elbow. The pipe may, for example, be made from a plastics material, such as, for example, polyethylene or an olefin polymer or copolymer.

The service pipe may be substantially un-modified, that is to say the pipe and the pipe end can be smooth-walled and without projections or other relief. However, various modification to the service pipe and pipe end may be desirable in certain circumstances. For example in some embodiments the wall of the service pipe which is insertable into the adaptor is preferably reinforced with an internal metal insert. The insert may be tubular in cross-section, and of length from about 2 to 4 cms. In a preferred configuration, the reinforced end of the service pipe is configured so as to surround and fit tightly around the insert.

In a further embodiment, instead of, or in addition to the internal annular seal of the bore of the adaptor, the service pipe may be provided with external circumferential lugs or indentations which themselves form a seal or cooperate with the internal annular seal to improve the gas tightness of the connection.

The act of pushing the service pipe into the annular bore will normally be sufficient to dislodge the blocking means, but if desired the pipe or the metal insert may be provided with serrated or castellated legs or teeth to provide opening or leak paths through which gas can pass to equilibrate the gas pressure on each side of the displaceable blocking means and avoid the possibility that the blocking means may be retained by differential gas pressure on the end of the service pipe. The legs or teeth may also be used to cut through the displaceable blocking means in certain embodiments.

The rigid body of the adaptor may be moulded or cast as appropriate. Preferably the body of the adaptor is formed from a plastics material, such as, for example Delrin (Trade Mark), and is injection moulded.

In an especially preferred embodiment according to the invention, the adaptor is provided with a security means which, when in place, locates the service pipe in position relative to the adaptor, or acts as a stop means to prevent the service pipe from being pushed or driven further into the annular bore. For example, prior to assembly on the distribution main, the security means can prevent the service pipe from being pushed or driven prematurely sufficiently far into the annular bore to displace the blocking means. The security means may, for example, comprise a C-shaped collar which can be positioned around the service pipe, engaging with collar on the service pipe, and such that it rests on a rim or other portion of the body of the adaptor, thereby preventing the service pipe from being pushed or driven further into the adaptor. In a preferred method according to the invention, the security means is removed to allow the service pipe to be pushed or driven into the adaptor to displace the blocking means, and the pipe is then pulled back sufficiently to allow the security means to be replaced. The security means thus prevents accidental movement of the service pipe in use, which could tend to displace the internal annular seal.

The method of the invention may be, and preferably is, carried out using an adaptor as hereinbefore described. It is to be understood, however, that the method could be carried out using any suitable adaptor comprising a rigid body with an internal bore therein, in which the bore is closed with a displaceable blocking means.

Examples of an adaptor and method according to the invention will now be described with reference to and as illustrated in the accompanying Drawings in which:

FIG. 1 shows a first adaptor according to the invention and an elbow service pipe in section side elevation;

FIG. 2 shows a plan view of the adaptor of FIG. 1;

FIG. 3 shows a service pipe for use with the invention;

FIG. 4 shows a pre-assembled second adaptor and elbow service pipe according to the invention in sectional side elevation; and FIG. 5 shows a plan view of the security clip of FIG. 4.

Referring to FIGS. 1 to 3 of the Drawings, the adaptor, designated generally at (1), comprises a rigid body portion (2) having an annular internal bore (3). The body has an upper external polygonal section and a lower external threaded section (4), which is adapted to cooperate with an internal threaded bore of a hole in a distribution main. External annular sealing means (5), situated between the upper polygonal section and the lower threaded section, comprise an annular flange (6) having a face (7) within which is located a recess (8). Within the recess is seated an O-ring (9) of resilient polymeric material.

The internal bore (3) of the adaptor is provided with a knock-out plug (10) which is seated in a recess (11) in the distribution main end of the internal bore (3). Further annular recesses (12), (13) in the upper part of the internal bore (3) house pairs of gas seals and end-loading rings (14), (15) respectively.

The service pipe (16), formed from a suitable grade of high-density polyethylene, has an elbow (17) and a reinforced section (18). The section (18) is reinforced by a tubular metal insert (19).

In fitting or replacing the branch-off connection, the old branch tee is unscrewed and removed through the bell as previously described, or a new screw-threaded hole is drilled in the distribution main, as appropriate. The adaptor (1) is then inserted into the bell and screwed into position until the O-ring (9) is pressed firmly against the wall of the distribution main. The bell is then removed, and the adaptor remains gas-tight as the annular bore (3) is sealed by the knock-out plug (10). After pressure testing the subscriber's system, the reinforced end (18) of the service pipe (16) is inserted into the annular bore (3) and pushed down until it contacts the knock-out plug (10). The plug (10) is displaced by the downward passage of the end of the service pipe and falls into the distribution main, allowing gas to flow to the subscriber. In certain circumstances, the use of the bell can be dispensed with, and the hole in the distribution main simply plugged by hand using a rag whilst the changeover of the adaptor for the branch tee is carried out.

In an alternative embodiment, the reinforcing metal insert (19) can be extended, as shown at 20, and provided with serrated teeth or castellations (21) to provide a gas path behind the knock-out plug or to pierce or sever the knock-out plug (10).

In a further alternative embodiment, as shown in FIG. 3, the reinforced section (18) of the service pipe (16) can be provided with annular lugs (22), which act to seal the internal bore of the adaptor, or with annular indentations (23), which cooperate with the gas seals and end-loading rings (15) to seat the pipe firmly within the annular bore (3).

Referring now to FIGS. 4 and 5 of the Drawings, a further embodiment of an adaptor, designated generally at (30), comprises a rigid body portion (31) having an annular internal bore (32). The body has an upper external polygonal section (33), and a lower external threaded section (34) which is adapted to cooperate with an internal threaded bore of a hole in a distribution main. An external annular sealing means (35), situated between the upper polygonal section (33) and the lower threaded section (34) comprises an annular flange (36) having an annular recess (37) within which is situated an O-ring (38) of generally rectangular cross-section, and made of resilient polymeric material.

The internal bore (32) of the adaptor is provided with a knock-out plug (39) which is clipped in the bore (32). A second O-ring (40) is position in an annular recess in the internal bore (32) adjacent a shoulder (41).

The service pipe (42), formed from a suitable grade of high density polyethylene, has an elbow (43) and a reinforced end section (44). The end section is reinforced by a tubular metal insert (45) and is provided with a shoulder (46) which cooperates with the shoulder (41) in the annular bore and the O-ring (40) to form a gas-tight seal.

A security clip (47) has generally C-shaped jaws (48) which are positioned around the service pipe (42) such that the clip is seated between an annular shoulder (49) on the service pipe and the rim (50) of the adaptor body (31).

The service pipe (42) is arranged to be rotatable in the adaptor body (31) so that the outlet of the elbow may be freely rotated to any desired position. This enables the adaptor to be screwed to the main to effect a seal without the necessity to rotate the whole arrangement on the screw thread to bring the outlet of the service pipe to the correct position.

In fitting or replacing the branch-off connection, the old branch tee is removed, or a new screw-threaded hole drilled in the distribution main, as previously described. The adaptor is then screwed into the hole in the main and the service pipe connected to the subscriber service. The entire subscriber service line is then pressure tested against the knock-out plug. The knock-out plug (39) is resiliently clipped or otherwise retained in the bore (32) by retaining means that are sufficient to retain the plug against a pressure test of the service pipe (42) but such that the plug can be displaced by the application of reasonable force on the top of the elbow (43).

To introduce live gas from the distribution main into the subscriber service line the security clip is first removed and the service pipe pushed down to dislodge the knock-out plug into the service main, allowing gas to enter the subscriber line. To provide a good seating for the annular seal provided by the O-ring (40), the service pipe is then pulled back until the shoulders (41) and (46) are in close proximity, and the clip is then replaced to maintain the service pipe in position.

Although the invention has been described with reference to the connection of a service pipe to a gas distribution main, it is not limited thereto, and it will be apparent that the invention can be applied to other pipe connections and in particular to the connection of pipes carrying water, sewage or other liquids.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract and drawings), and/or all of the steps or any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

We claim:

1. An adaptor for fitting or replacing a branch-off connection in a fluid distribution main, and adapted to be received in a hole of the wall of the fluid distribution, which comprises:

a rigid integral body having an internal bore therein,
   the internal bore being adapted to receive a service pipe therein, and
   a blocking means positioned so as to close the internal bore, said blocking means being positioned in the internal bore so as to be displaceable and completely detachable upstream of the service pipe by inward pushing movement of the service pipe and without rotation of the rigid body, in order to open the internal bore,
   the rigid body having a threaded external section and an external annular seal adapted to form a gas tight seal with the wall of the fluid distribution main.

2. An adaptor according to claim 1, wherein the external annular seal comprises an O-ring seated in a recess in an annular flange.

3. An adaptor according to claim 1, wherein the displaceable blocking means comprises a knock-out plug.

4. An adaptor according to claim 3, wherein the knockout plug is seated in a recess at the distribution main end of the internal bore of the adaptor.

5. An adaptor according to claim 1 which is provided with a security means which, when in place, locates the service pipe in position relative to the adaptor or acts a stop means to prevent the service pipe from being pushed or driven further into the internal bore and which, when in place, prevents the service pipe from being pushed or driven sufficiently far into the internal bore to displace the blocking means.

6. An adaptor according to claim 5, wherein the security means comprises a collar which can be positioned around the service pipe such that it rests on a rim or other portion of the body of the adaptor, thereby preventing the service pipe from being pushed or driven further into the adaptor.

7. A kit of parts comprising an adaptor according to claim 1 and a service pipe.

8. A kit of parts according to claim 7, wherein the service pipe is an elbow.

9. A kit of parts according to claim 7, wherein the wall of the service pipe which is insertable into the adaptor is reinforced with an internal metal insert.

10. A kit of parts according to claim 7, wherein the end of the service pipe insertable into the adaptor bore is provided with pressure equilibrium means to equilibrate the gas pressure on each side of the displaceable blocking means.

11. A kit of parts according to claim 7, wherein at least one of the pipe and the metal insert is provided with serrated or castellated legs or teeth to provide openings or leak paths through which gas can pass.

12. A kit of parts according to claim 7, wherein the service pipe is substantially smooth-walled.

13. A kit of parts comprising an adaptor according to claim 1 and a service pipe, wherein the service pipe is provided with external circumferential lugs or indentations which themselves form a seal or co-operate with an internal annular seal to improve the gas-tightness of the connection.

14. An adaptor assembly which comprises an adaptor according to claim 1 with a service pipe inserted into the bore thereof.

15. An adaptor assembly according to claim 14, wherein the service pipe is rotatable in the adaptor body.

16. An adaptor according to claim 1 in which the internal bore is not threaded.

17. A method of fitting or replacing a branch-off connection in a fluid distribution mean which comprises:

inserting an adaptor into a hole in a wall of the distribution main,
   the adaptor comprising a rigid integral body with an internal bore therein, the internal bore being closed with a disposable blocking means, and
   inserting a service pipe into the internal bore of the adaptor so to displace and completely detach the blocking means upstream of the service pipe without requiring the rotation of the rigid body, to open the internal bore of the adaptor.

18. A method according to claim 17, further comprising providing the adaptor with a security means which acts as a stop means to prevent the service pipe from being pushed or driven prematurely sufficiently far into the internal bore to displace the blocking means.

19. A method according to claim 17, further comprising positioning a collar of the security means around the service pipe such that it rests on a rim or other portion of the body of the adaptor, thereby preventing the service pipe from being pushed or driven further into the adaptor.

20. A method according to claim 18, further comprising removing the security means to allow the service pipe to be pushed or driven into the adaptor to displace the blocking means, and pulling the pipe back sufficiently to allow the security means to be replaced.

* * * * *